United States Patent [19]
Schlachter

[11] Patent Number: 5,498,049
[45] Date of Patent: Mar. 12, 1996

[54] HINGED SECURITY TRUNK FOR VEHICLE TAILGATE

[76] Inventor: Bradley S. Schlachter, 6211 W. Northwest Hwy., Ste. 253D, Dallas, Tex. 75225

[21] Appl. No.: 383,107

[22] Filed: Feb. 3, 1995

[51] Int. Cl.⁶ .................................................. B60R 9/06
[52] U.S. Cl. .................. 296/37.6; 224/404; 224/543; 224/504
[58] Field of Search .................... 296/37.6, 180.1; 224/42.42

[56] References Cited

U.S. PATENT DOCUMENTS

| | | | |
|---|---|---|---|
| 3,393,936 | 7/1968 | Hall | 296/24 |
| 3,940,009 | 2/1976 | Szeles | 220/20 |
| 4,215,896 | 8/1980 | Drouin | 296/24 R |
| 4,266,821 | 5/1981 | Gillet | 296/37.6 |
| 4,451,075 | 5/1984 | Canfield | 296/37.6 |
| 4,506,870 | 3/1985 | Penn | 296/1 S |
| 4,531,773 | 7/1985 | Smith | 296/26 |
| 4,749,226 | 6/1988 | Heft | 296/37.6 |
| 4,861,088 | 8/1989 | Fedrigo | 296/57.1 |
| 4,884,838 | 12/1989 | Slater | 296/180.1 |
| 4,938,398 | 7/1990 | Hallsen | 224/42.42 |
| 4,946,215 | 8/1990 | Taylor | 296/37.6 |
| 4,971,234 | 11/1990 | Hay | 224/42.32 |
| 5,083,829 | 1/1992 | Foneseca | 296/37.6 |
| 5,207,469 | 5/1993 | Rossi | 296/37.6 |
| 5,232,259 | 8/1993 | Booker | 296/37.6 |

*Primary Examiner*—Joseph D. Pape
*Attorney, Agent, or Firm*—Dennis T. Griggs

[57] ABSTRACT

A security enclosure or trunk for luggage, tools and other property, particularly adapted for use with utility vehicles such as light duty trucks having hinged tailgates. The enclosure is adapted to be hinged to the vehicle tailgate and disposed in the vehicle loadbox when the tailgate is in a closed position. The enclosure may be moved with the tailgate to its open position to provide maximum cargo storage space in the loadbox. Access to the enclosure is obtained by opening the tailgate while leaving the enclosure in or moving it to its upright position supported on the vehicle cargo deck.

19 Claims, 3 Drawing Sheets

5,498,049

HINGED SECURITY TRUNK FOR VEHICLE TAILGATE

FIELD OF THE INVENTION

The present invention relates generally to a security trunk or enclosure, which is adapted for mounting on a hinged tailgate of an automotive utility vehicle, such as a pickup truck.

BACKGROUND

One limitation of utility type motor vehicles, including light duty trucks, is the lack of securable storage space for luggage, tools, equipment and any high value item desired to be carried in the vehicle which requires protection from the elements and avoidance of unauthorized use or theft. The increasingly widespread use of light duty, open bed "pickup" trucks by tradesmen as well as for personal transportation vehicles has increased the need for improvements in securable storage space or "trunks" in such vehicles.

DESCRIPTION OF THE PRIOR ART

It is known to provide storage enclosures or trunks for securing portable property such as tools, luggage and equipment on the load bed of an open utility or light duty truck type motor vehicle. For example, pickup trucks include a generally rectangular box-like load bed, and enclosures or security trunks have been developed which mount on the forward portion of the load bed, just behind the truck cab. While these enclosures may provide a secure and weather-tight enclosure for property, they are difficult to gain access to for loading and unloading property therefrom. Moreover, these enclosures reduce the overall cargo carrying capacity of the truck load bed.

It is also known to provide security enclosures which mount in the load bed or box of a light duty truck or similar utility vehicle rearward of the cab and generally adjacent to the rear tailgate. While some of these types of enclosures permit easier access to at least parts of the enclosure to load and unload property with respect thereto, such enclosures also reduce the load carrying capacity of the load bed or box.

It has also been proposed to mount a toolbox or enclosure on the tailgate of a pickup truck wherein spaced apart stanchions are secured to the tailgate and support a toolbox on trunions which permit the toolbox to remain in a horizontal or upright position, when the tailgate is open or closed. However, the clearance required to maintain the toolbox in an upright position, regardless of the position of the tailgate, requires the toolbox to occupy a considerable amount of space within the load bed. This toolbox also does not include an air deflecting, sloping front wall to minimize aerodynamic drag on the truck. Moreover, the pivoted toolbox arrangement does not utilize the tailgate as a closure member for the trunk or enclosure structure itself.

Accordingly, prior art enclosures for open load bed vehicles, such as light duty pickup trucks, as well as vehicles which are provided with one way or two way tailgates, do not include certain advantages which have been sought for such enclosures. The present invention does provide these advantages as will be summarized and described in detail hereinbelow.

SUMMARY OF THE INVENTION

The present invention provides an improved security trunk or enclosure for use with utility vehicles, including light duty, open bed pickup trucks, and other vehicles which have a hinged tailgate at an access opening to the load bed or load deck.

In accordance with one important aspect of the invention, a security enclosure is provided which adapted to be mounted on and hinged to a tailgate closure for a cargo box or load bed of an automotive vehicle, which tailgate is operable to be moved between open and closed positions about a horizontal hinge axis.

In accordance with another important aspect of the invention, a security enclosure is provided which is particularly adapted for mounting on the tailgate of an open loadbox vehicle, such as a pickup truck by suitable hinges which provide for opening the tailgate while allowing the security enclosure to remain substantially upright for access to its interior storage compartment. Accordingly, the enclosure or "trunk" may remain in a horizontal or upright position regardless of whether the tailgate is open or closed. Alternatively, the enclosure may be moved along with the tailgate to the gate open position thereby making the entire loadbox available for carrying cargo.

In accordance with yet another aspect of the present invention, a security enclosure is provided which is particularly adapted for being connected to the tailgate of a utility vehicle or pickup truck and which may be easily moved, in a closed position, with the tailgate. The enclosure is also provided with a sloping front wall configured to minimize aerodynamic drag on the vehicle. The enclosure is further provided with a unique seal or flap interposed between a top edge of the enclosure and the tailgate.

Those skilled in the art will further appreciate the above-mentioned advantages and superior features of the invention together with other important aspects thereof upon reading the detailed description which follows in conjunction with the drawings.

DESCRIPTION OF A PREFERRED EMBODIMENT

Figure 1:
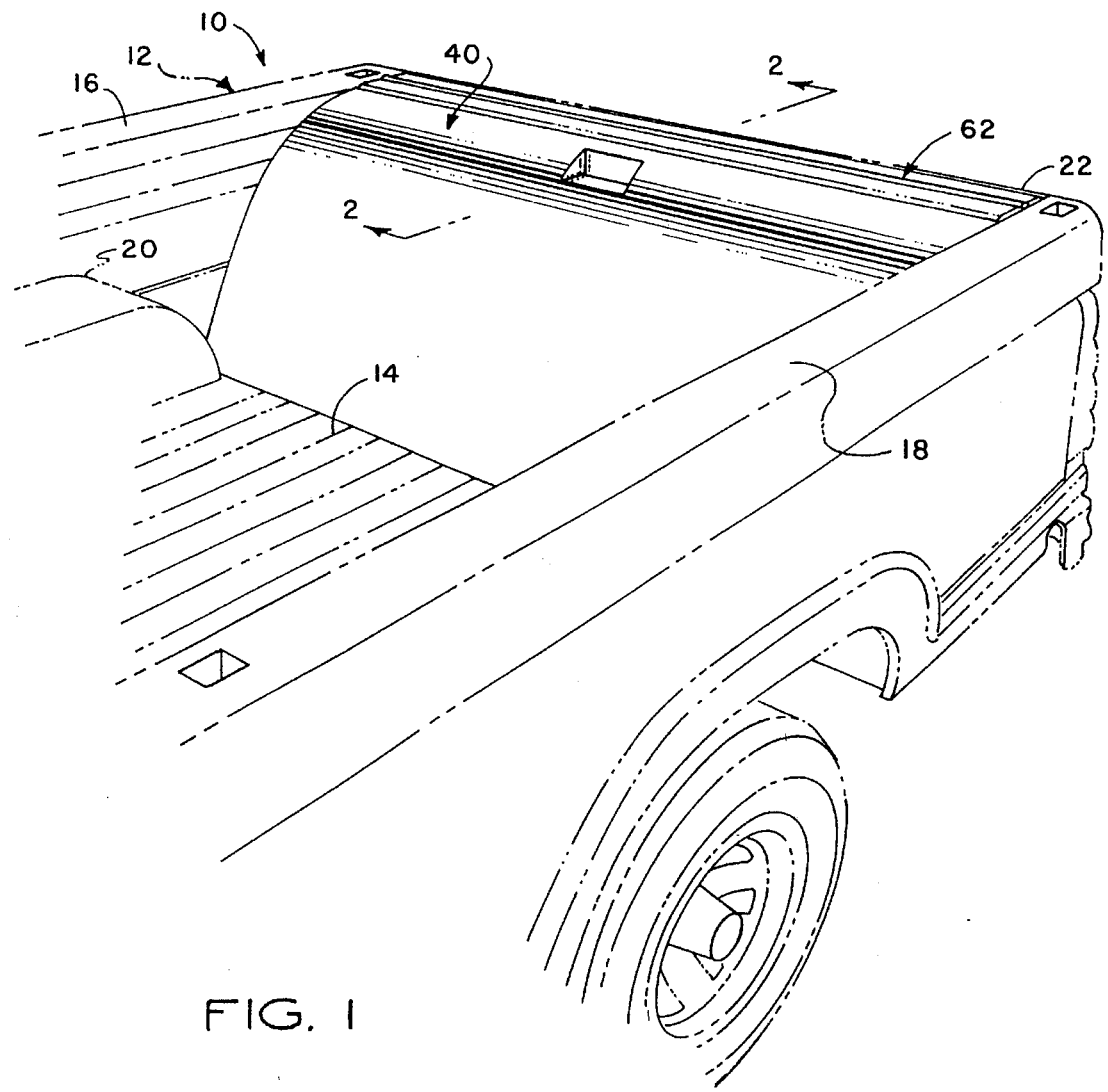
FIG. 1 is a perspective view of a light duty or pickup truck showing the security enclosure of the present invention disposed in the loadbox in a closed position of the loadbox tailgate.

In the description which follows, like parts are marked throughout the specification and drawing with the same reference numerals, respectively. The drawing figures are not necessarily to scale in all respects.

Figure 2:
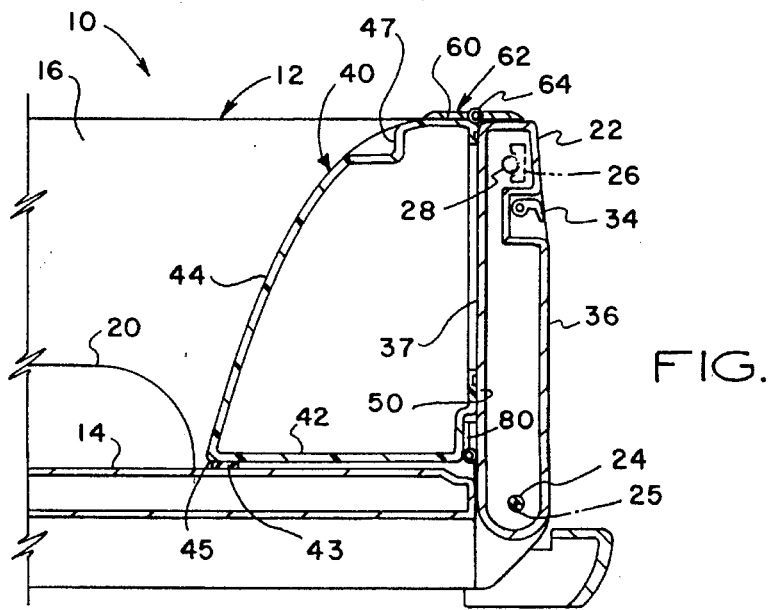
FIG. 2 is a sectional view taken generally from the line 2—2 of FIG. 1 with the tailgate in a closed position.
Figure 3:
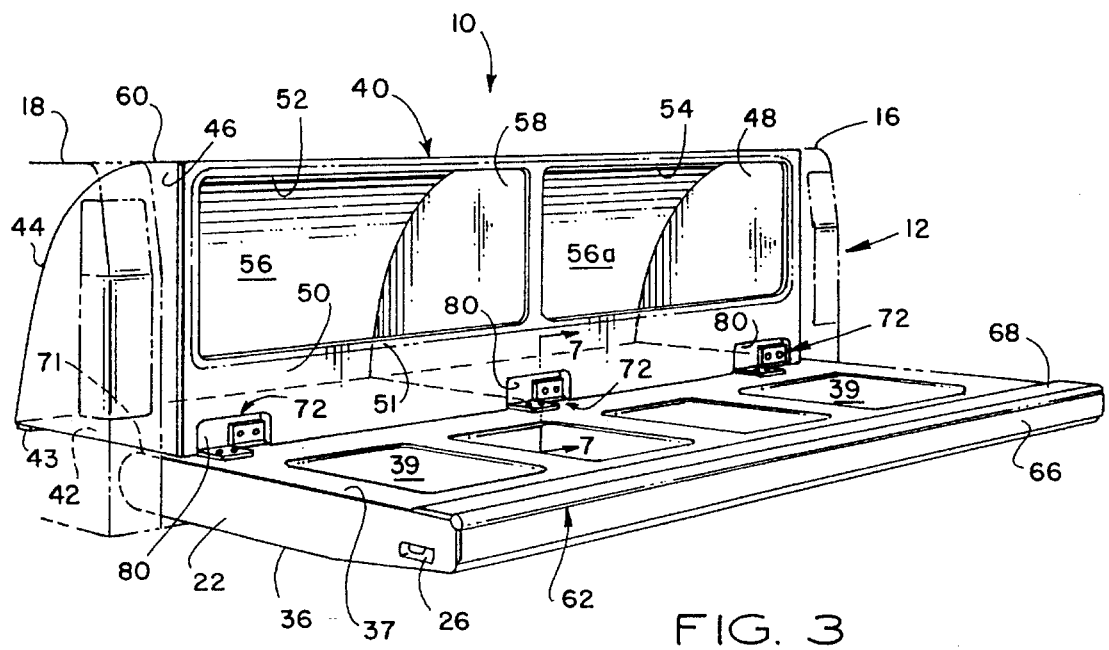
FIG. 3 is a perspective view of the truck shown in FIG. 1 with the tailgate open to illustrate how access to the security enclosure is obtained.
Figure 4:
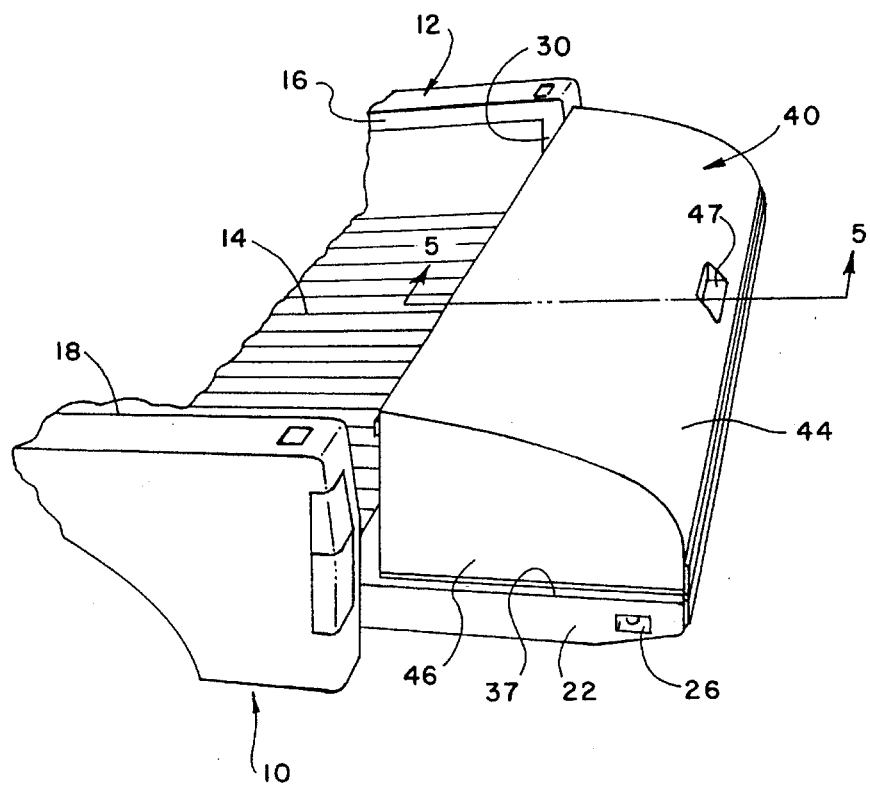
FIG. 4 is a perspective view of the tailgate in an open position while the security enclosure remains closed.

Referring to FIGS. 1 and 2, there is illustrated the rear portion of a utility type automotive vehicle such as a light duty or "pickup" truck, generally designated by the numeral 10. The truck 10 may be of conventional design and provided with a rectangular loadbox 12 including a generally horizontal, corrugated load deck 14 and opposed side panels 16 and 18. Interior fenders 20, one shown, delimit the rear wheel wells of the truck 10 in a conventional manner. The truck 10 includes a transversely extending tailgate 22, FIG. 2, of conventional design and forming a rear closure for the loadbox 12. Referring further to FIG. 2, the tailgate 22 is suitably connected to the loadbox 12 for movement between closed and open positions by conventional hinge means 24 having a generally horizontal pivot axis 25. The tailgate 22 may be moved between open and closed positions as shown in FIGS. 2, 3 and 4, in a conventional manner. Suitable latches 26, one shown in FIGS. 2 and 3, are mounted on opposite sides of the tailgate 22 and provide for latching the tailgate 22 in a closed position and engaged with suitable latch pins 28, one shown in FIG. 2 which project from sidewall portions of the loadbox 12 in a conventional manner. The tailgate 22 forms a closure for a rear access opening 30, FIGS. 4 and 5, delimited by side panels 16 and 18 add load deck 14. The tailgate 22 is of a type which has an internal latch mechanism, not shown, which may be operated by a manual, preferably lockable, operator handle 34, FIG. 2, disposed on the tailgate outer wall 36, to unlatch the tailgate for movement to its open position.

The aforementioned structural features are generally conventional in light duty pickup trucks and other utility vehicles which have open loadboxes. The aforementioned type of tailgate is also conventional in station wagon or similar utility type motor vehicles and may also be of the two-way type which includes suitable mechanism for moving the gate about a vertical hinge axis by suitable hinge mechanism, not shown in the drawing.

Referring further to FIGS. 1 and 2 and also FIG. 3, the present invention provides a unique enclosure or "trunk" cooperable with the tailgate 22 and generally designated by the numeral 40. The enclosure 40 has a bottom wall or floor part 42, FIG. 2, a contoured or curved front wall 44 sloping upward and rearward from the floor 42 and preferably formed integral therewith. The enclosure 40 also includes opposed sidewalls 46 and 48, FIG. 3 and, preferably, a rear wall 50 having suitable, generally rectangular openings 52 and 54 formed therein to permit access to storage compartments 56 and 56a. The compartments 56, 56a are separated by a generally vertically extending partition 58 between the openings 52 and 54. Alternatively, the rear wall 50 may have one transversely extending opening formed therein and the partition 58 may be eliminated.

The transverse width of the enclosure 40 may extend substantially between the loadbox side panels 16 and 18 or be somewhat less than the distance between the sidewalls. The slope of the front or forward wall 44 is rearward from a juncture 45 with the bottom wall 42 to a relatively narrow, generally horizontal top wall portion 60 of the enclosure 40. The configuration of the front wall 44 is advantageous in minimizing aerodynamic drag on the vehicle 10 when the tailgate 22 is in its closed position, FIGS. 1 and 2. The overall height of the enclosure 40, with respect to the deck 14, is preferably about the same or slightly less than the height of the tailgate 22 in its closed position. The front wall 44 may extend forwardly to a position just behind the fenders 20, for example. The bottom wall 42, which extends between walls 46 and 48 and between walls 44 and 50, may be provided with an elastomeric cushion or bumper member 43, suitably secured thereto and engageable with the load deck 14, as shown in FIG. 2. The cushion member 43 may be made of a suitable resilient elastomeric material and may extend substantially along the bottom wall 42 between the opposed sidewalls 46 and 48. The cushion member 43 aids in supporting the enclosure 40 in firm engagement with the inner wall 37 of the tailgate 22 when the tailgate is in the position shown in FIG. 2. The cushion member also remains interposed between the bottom wall 42 and the load deck 14 in supportive relationship to the enclosure in the position shown in FIG. 3.

Figure 6:
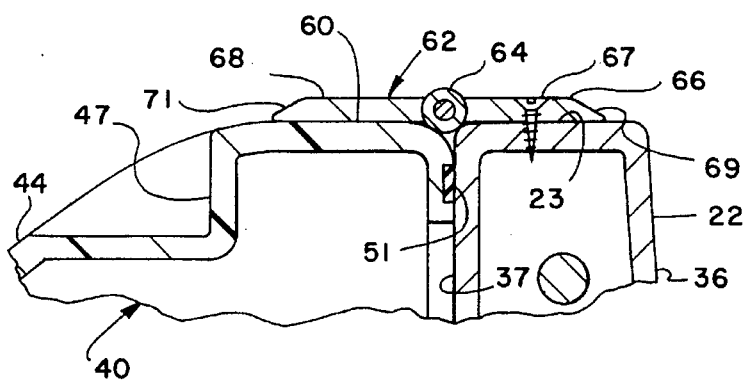
FIG. 6 is a detail sectional view with the gate and security enclosure in a closed position and showing certain details of a closure seal or flap.

Referring briefly to FIG. 2 and FIG. 6, the enclosure 40 may be advantageously provided with an elongated flap, generally designated by the numeral 62, which has a central hinge portion 64 and opposed flanges 66 and 68. The flange 66 may be substantially coextensive with the top edge 23 of the tailgate 22, FIG. 6, and secured thereto with spaced apart conventional coachwork fasteners 67, for example. The flange 66 may be appropriately tapered at 69. The flange 68 is adapted to overlie the top wall portion 60 of the enclosure 40 to minimize intrusion of dust and water into the enclosure spaces 56 and 56a. The flange 68 is also tapered at 71 to fair into the contour of the wall 44. The flange 68 may also be provided with suitable latching means, not shown, for securing the enclosure 40 to the tailgate 22, which latch means would be operable at will to release the connection between the top edge of the enclosure 40 and the tailgate so that the respective components may assume the positions shown in FIG. 3.

The front wall 44 may be provided with a suitable recess 47 forming a handgrip for assisting in opening of the tailgate 22 with the enclosure 40 operable to remain in the closed position shown in FIG. 4. As shown in FIGS. 3 and 6, the rear wall 50 of the enclosure 40 may be provided with a resilient peripheral edge seal member 51 for engagement with the inner wall 37 of the tailgate 22 to form a seal for the compartments 56 and 56a. As shown in FIG. 3, the openings 52 and 54 are preferably dimensioned such that any embossed areas 39 in the tailgate inner wall 37 will be disposed within the envelope of the openings 52 and 54 and, thus, the seal 51 will engage a substantially planar surface of the inner wall 37.

Figure 7:
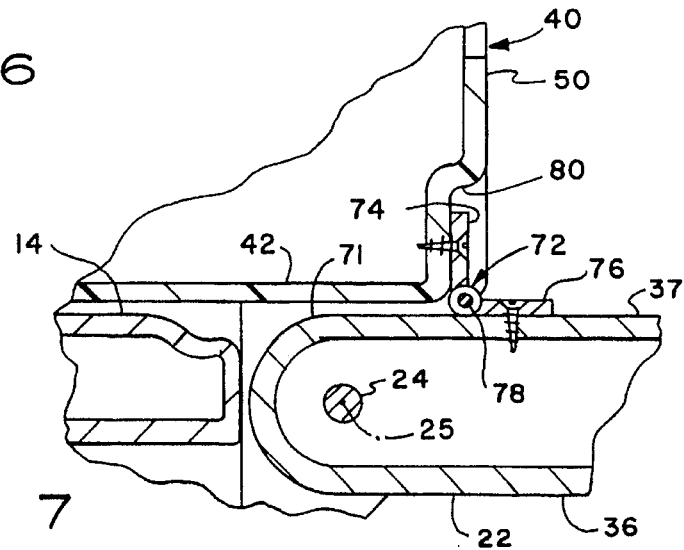
FIG. 7 is a detail sectional view taken generally from the line 7—7 of FIG. 3.

Referring now to FIGS. 3 and 7, in particular, the enclosure 40 is advantageously secured to the tailgate 22 along or near the lower edge 71 of inner wall 37 by spaced apart hinges 72. The hinges 72 have respective hinge plates 74 and 76 interconnected by suitable hinge pins 78, see FIG. 7, and suitably secured to the walls 50 and 37, respectively. Substantially flush mounting of the wall 50 with the wall 37 of the tailgate 22 is facilitated by providing suitable recesses 80 in the wall 50 for the hinges 72, as shown in FIGS. 3 and 7.

Accordingly, the unique vehicle enclosure 40 may reside in three different positions as illustrated in FIGS. 1 and 2, FIG. 3 and FIG. 4, respectively. The position of the enclosure 40 shown in FIGS. 1 and 2 is the closed working position of the enclosure when the tailgate 22 is in its closed position with respect to the loadbox 12. If the entire loadbox 12 is not required for cargo carrying activity, the tailgate 22 would normally be in the closed position shown in FIGS. 1 and 2 and this would be a closed working position of the security enclosure 40 also. In the working position of the enclosure 40, the flap assembly 62 would be in the position illustrated in FIG. 6. If it is desired to gain access to the storage compartments 56 and 56a, the tailgate 22 may be opened in a conventional manner by operating the latch operator handle 34 to release the gate latches 26 for movement of the tailgate to the position shown in FIG. 3.

Convenient access is then provided for placing objects in or removing objects from the storage compartments 56 and 56a. The limited depth of openings 52 and 54 prevents items from falling out of compartments 56 and 56a.

Figure 5:
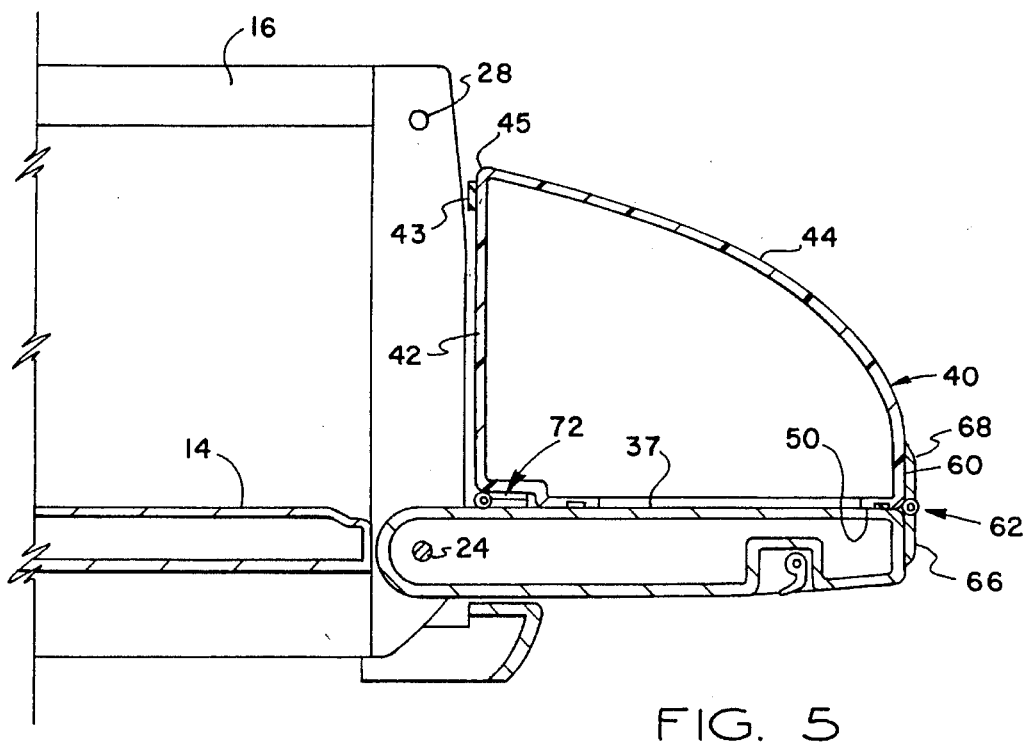
FIG. 5 is a sectional view taken from line 5—5 of FIG. 4.

Alternatively, if it is desired to provide maximum storage space in the loadbox 12, the tailgate 22 and enclosure 40 may be moved together to the position shown in FIGS. 4 and 5. The tailgate 22 may be unlatched with one hand while the enclosure 40 is held in its closed position by grasping the handgrip 47 with the other hand and opening the tailgate to move the enclosure 40 to the position shown in FIGS. 4 and 5. In this position, the enclosure 40 remains closed and the storage spaces 56 and 56a secure. When the tailgate 22 and the enclosure 40 are moved together from the open position shown in FIGS. 4 and 5 to the closed position shown in FIGS. 1 and 2, the resilient cushion member 43 engages the load deck 14 to urge the wall 50 in slightly forcible engagement with the wall 37. In this way, if the seal member 51 is provided, it becomes effective to form a substantially weathertight seal between the walls 50 and 37. Alternatively or in addition to the effectiveness of the seal 51, the flap assembly 62 aids in providing a weather seal and a security closure to minimize intrusion into the enclosure 40 by attempting to pry the wall 50 away from the wall 37, for example.

Those skilled in the art will further appreciate that the enclosure 40 may also be configured to have a solid rear wall 50 which may be hinged to the bottom wall 42 so that the compartments 56 and 56a are accessed only when the wall 50 is folded down and substantially coplanar with the tailgate inner wall 37 in the position of the enclosure 40 shown in FIG. 3.

The enclosure 40 may be fabricated of conventional engineering materials used for enclosures of the general type described herein including sheet metal or reinforced plastic, for example. The sidewalls 46, 48, the front wall 44, the bottom wall 42 and partition 58 may be formed integral with each other or suitably assembled from separate parts and the rear wall 50 may be suitably secured to the assembly of the aforementioned integral or joined members.

Those skilled in the art will appreciate from the foregoing description that a unique cargo carrying security enclosure is provided in accordance with the invention for use with utility vehicles, light duty or pickup trucks and similar motor vehicles provided with a hinged tailgate. Although a preferred embodiment of the invention has been described in detail herein, those skilled in the art will also appreciate that various substitutions and modifications may be made without departing from the scope and spirit of the invention as recited in the appended claims.

What is claimed is:

1. A security enclosure for a motor vehicle having a load deck, opposed side panels and a tailgate, said tailgate being coupled to said vehicle for movement to and from open and closed positions relative to the load deck and side panels, said security enclosure comprising:

enclosure wall means defining a storage compartment having an access opening; and means interconnecting said enclosure wall means and said tailgate thereby permitting movement of the enclosure wall means to a resting position on the load deck with the access opening being covered by the tailgate when the tailgate is in a closed position relative to the load deck and side panels, said enclosure wall means being movable to a resting position on said tailgate when said tailgate is in an open position relative to the load deck and side panels, with the access opening of the storage compartment being covered by the tailgate when the tailgate is in the open position, and said enclosure wall means being movable relative to said tailgate to the load deck resting position wherein the access opening of said storage compartment is uncovered when said tailgate is in the open position.

2. The security enclosure set forth in claim 1 wherein:

said enclosure wall means comprise a bottom wall, a front wall joined to said bottom wall and opposed sidewalls.

3. The security enclosure set forth in claim 2 including:

a rear wall extending between said sidewalls, said bottom wall and said front wall, and said means interconnecting said enclosure wall means and said tailgate comprises hinge means connected to said rear wall and to said tailgate to provide for pivotal movement of said enclosure wall means between open and closed positions of said storage compartment.

4. The security enclosure set forth in claim 3 wherein:

said rear wall has at least one access opening formed therein to permit access to said storage compartment when said enclosure wall means is in an open position.

5. The security enclosure set forth in claim 3 including:

an elongated flap secured to a top edge of said tailgate and operable to extend over a portion of said enclosure wall means when said enclosure is in a closed position with respect to said tailgate.

6. The security enclosure set forth in claim 2 wherein:

said front wall includes a portion which slopes upwardly and rearwardly from a juncture with said bottom wall to minimize aerodynamic drag on said vehicle in a working position of said enclosure.

7. The security enclosure set forth in claim 2 including:

means on said front wall defining a handgrip for moving said enclosure with said tailgate between a closed position of said tailgate and an open position of said tailgate.

8. The security enclosure set forth in claim 2 including:

a rear wall extending between said sidewalls, said bottom wall and said front wall, and at least one opening formed in said rear wall providing access to said storage compartment.

9. The security enclosure set forth in claim 8 including:

a peripheral seal member disposed on said rear wall and around said opening and engageable with said tailgate to form a seal between said rear wall and said tailgate when said enclosure is in a closed position with respect to said tailgate.

10. The security enclosure set forth in claim 1 including:

a cushion member disposed on said bottom wall and engageable with said deck when said tailgate is in a closed position on said loadbox.

11. An enclosure for a vehicle having a tailgate mounted thereon for movement about a generally horizontal hinge axis between a closed position and a generally horizontal open position, said enclosure being defined by:

enclosure wall means defining at least one storage compartment in said enclosure; and means interconnecting said enclosure with said tailgate in such a way that, in a closed position of said tailgate, said enclosure and said tailgate are cooperable to prevent access to said storage compartment, said enclosure being movable with said tailgate between open and closed positions of said tailgate while said storage compartment remains closed and access to said storage compartment is provided by placing said tailgate in said open position with said enclosure remaining in a generally upright position relative to said tailgate.

12. The enclosure set forth in claim 11 wherein:

said means interconnecting said enclosure with said tailgate comprises hinge means connected to a wall of said tailgate whereby said enclosure may be pivotally moved between open and closed positions with respect to said tailgate when said tailgate is in an open position with respect to said vehicle.

13. The enclosure set forth in claim 11 including:

an elongated flap secured to a top edge of said tailgate and operable to extend over and be engaged with a portion of said enclosure when said enclosure is in a closed position with respect to said tailgate.

14. A security enclosure for disposition on the load deck of a pickup truck, said pickup truck including opposed side panels, a rear access opening and a tailgate for closing said access opening and supported for movement about a horizontal hinge axis between a generally upright closed position and a generally horizontally extending open position with respect to said loadbox, said security enclosure comprising:

a bottom wall, opposed sidewalls and a front wall connected to said bottom wall and said sidewalls and sloping upwardly and rearwardly from a juncture with said bottom wall, said enclosure being proportioned to be disposed in said loadbox and extending between the side panels of said loadbox and generally adjacent said access opening;

hinge means for securing said enclosure to said tailgate for pivotal movement with respect to said tailgate between open and closed positions of said enclosure, said enclosure being movable with said tailgate between open and closed positions of said tailgate with respect to said loadbox whereby in a closed position of said tailgate with respect to said loadbox said enclosure is closed and in an open position of said tailgate with respect to said loadbox said enclosure may be moved between a closed position and an open position to provide access to a storage compartment within said enclosure.

15. The enclosure set forth in claim 14 including:

a rear wall of said enclosure having at least one opening formed therein to provide access to said storage compartment when said enclosure is in an open position with respect to said tailgate.

16. The enclosure set forth in claim 15 including:

a partition extending between said front wall and said rear wall and dividing said storage compartment.

17. The enclosure set forth in claim 14 including:

a resilient cushion member disposed on said bottom wall and engageable with said load deck in supportive relationship to said enclosure with respect to said load deck.

18. The enclosure set forth in claim 14 wherein:

said front wall slopes upwardly and rearwardly from a juncture with said bottom wall and toward a top edge of said tailgate to minimize aerodynamic drag on said vehicle.

19. The enclosure set forth in claim 14 including:

an elongated flap secured to a top edge of said tailgate and operable to extend over and be engaged with a portion of said enclosure when said enclosure is in a closed position with respect to said tailgate.

* * * * *